United States Patent
Yonekubo

(10) Patent No.: US 8,142,031 B2
(45) Date of Patent: Mar. 27, 2012

(54) IMAGE DISPLAY APPARATUS AND LIGHT SOURCE UNIT

(75) Inventor: Masatoshi Yonekubo, Hana-mura (JP)

(73) Assignee: Seiko Epson Corporation, Tokyo (JP)

( * ) Notice: Subject to any disclaimer, the term of this patent is extended or adjusted under 35 U.S.C. 154(b) by 1216 days.

(21) Appl. No.: 11/535,825

(22) Filed: Sep. 27, 2006

(65) Prior Publication Data

US 2007/0070303 A1    Mar. 29, 2007

(30) Foreign Application Priority Data

Sep. 29, 2005 (JP) ................................. 2005-285192

(51) Int. Cl.
G03B 21/26    (2006.01)

(52) U.S. Cl. .......................................... 353/94; 362/294

(58) Field of Classification Search ............... 353/31, 353/57–61, 119; 362/294; 169/69
See application file for complete search history.

(56) References Cited

U.S. PATENT DOCUMENTS

| | | | |
|---|---|---|---|
| 5,260,815 A * | 11/1993 | Takizawa ...................... | 349/159 |
| 5,398,086 A * | 3/1995 | Nakano et al. ................. | 353/31 |
| 5,704,700 A | 1/1998 | Kappel et al. | |
| 6,975,294 B2 * | 12/2005 | Manni et al. .................... | 345/83 |
| 7,271,962 B2 * | 9/2007 | Kasazumi et al. ............ | 359/707 |
| 7,524,084 B2 | 4/2009 | Ikeda et al. | |
| 2004/0022164 A1 * | 2/2004 | Nishioka et al. .......... | 369/112.05 |
| 2004/0239880 A1 | 12/2004 | Kapellner et al. | |
| 2005/0152146 A1 * | 7/2005 | Owen et al. .................... | 362/294 |
| 2006/0109390 A1 * | 5/2006 | Liang ............................... | 349/5 |
| 2007/0058135 A1 * | 3/2007 | Morikawa et al. ............. | 353/30 |

FOREIGN PATENT DOCUMENTS

| | | |
|---|---|---|
| EP | 0 985 952 A1 | 3/2000 |
| EP | 1 118 905 A2 | 7/2001 |
| EP | 1 292 134 A2 | 3/2003 |
| EP | 1 292 156 A1 | 3/2003 |
| JP | A-2000-162548 | 6/2000 |
| JP | A-2002-202414 | 7/2002 |
| JP | A-2002-214706 | 7/2002 |
| JP | A 2003-233123 | 8/2003 |
| JP | A-2005-099160 | 4/2005 |
| JP | A-2005-148694 | 6/2005 |
| JP | A-2006-178350 | 7/2006 |
| WO | WO 92/16872 | 10/1992 |

OTHER PUBLICATIONS

A.V. Shchegrov et al., "Development of compact blue-green lasers for projection display based on Novalux extended-cavity Surface emitting laser technology," Novalux, Inc., Mar. 2005.

Eva M. Strzelecka et al. "High Power, high brightness 980 nm lasers based on the extended cavity surface emitting lasers concept," Novalux, Inc., Jun. 2003.

(Continued)

*Primary Examiner* — Francis M Legasse, Jr.
*Assistant Examiner* — Jerry Brooks
(74) *Attorney, Agent, or Firm* — Oliff & Berridge, PLC

(57) ABSTRACT

An image display apparatus includes: a plurality of laser beam sources which emit different color light beams; a plurality of light modulators which modulate the light beams emitted from the laser beam sources; and a projection element which projects the light beams modulated by the light modulators, wherein the light modulators are disposed such that the light beams are incident from different directions, and the laser beam sources are concentrated in a single position.

17 Claims, 8 Drawing Sheets

OTHER PUBLICATIONS

J.P. Watson et al., "Compact, Efficient Visible Lasers based on the Novalux Extended Cavity Surface-Emitting Laser (NECSEL) Concept," Novalux, Inc., Sep. 12, 2003.
http://www.novalux.com/display/solidstatergb.php, Novalux, "The Future of Projection Displays," Apr. 17, 2006.
Projection Summit, "Novalux: The Dawn of Lasers in Projection," Novalux, Inc., Sunnyvale, CA., pp. 1-20, Jun. 6, 2006.
Aram Mooradian et al., "High Power Extended Vertical Cavity Surface Emitting Diode Lasers and Arrays and Their Applcations," Micro-Optics Conference, Tokyo, pp. 1-4, Nov. 2, 2005.
A.V. Shchegrov et al., "Development of compact blue-green lasers for projection display based on Novalux extended-cavity Surface emitting laser technology," Novalux, Inc.
Eva M. Strzelecka et al. "High Power, high brightness 980 nm lasers based on the extended cavity surface emitting lasers concept," Novalux, Inc.
J.P. Watson et al., "Compact, Efficient Visible Lasers based on the Novalux Extended Cavity Surface-Emitting Laser (NECSEL) Concept," Novalux, Inc.

* cited by examiner

F I G. 1
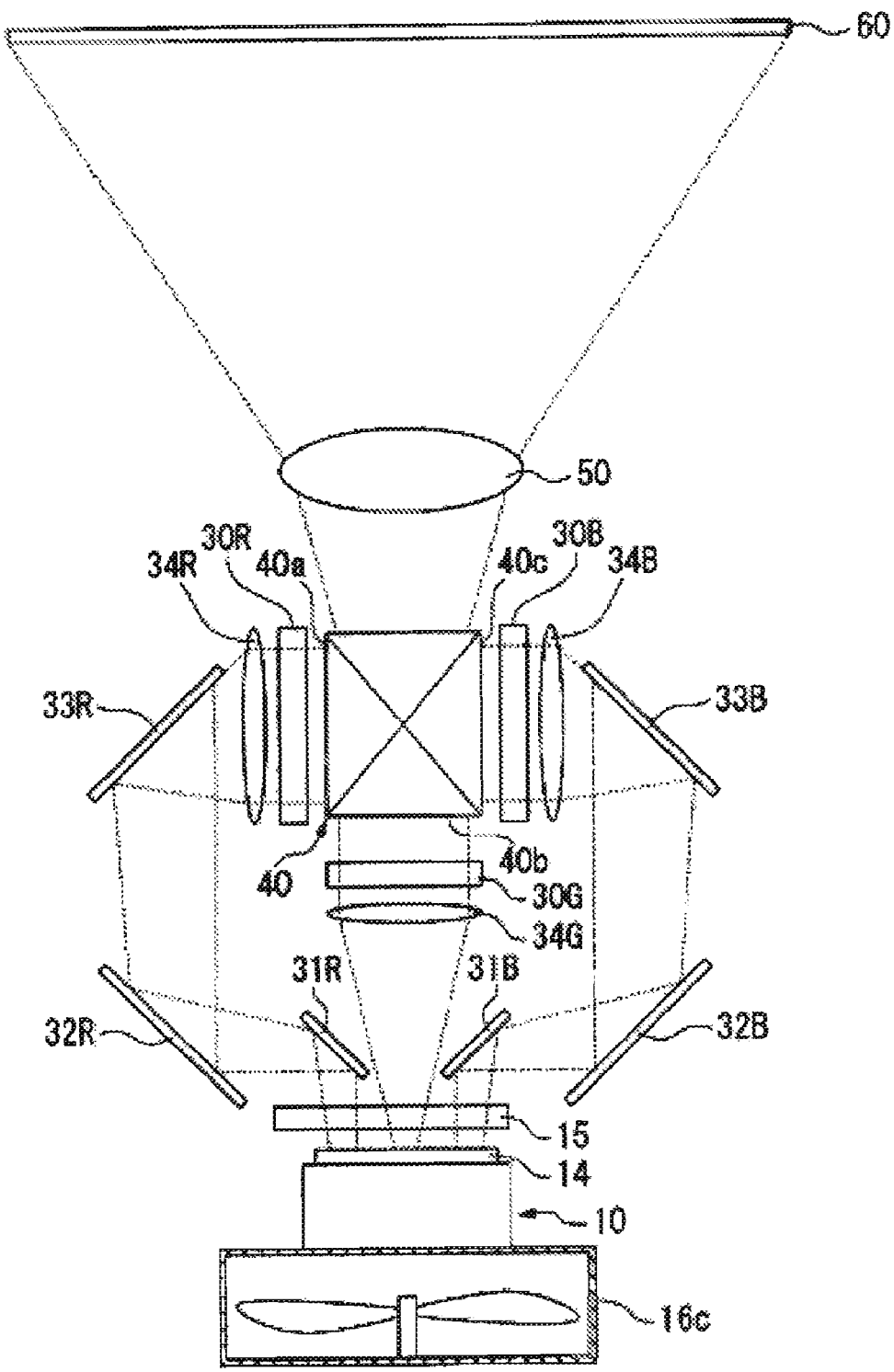

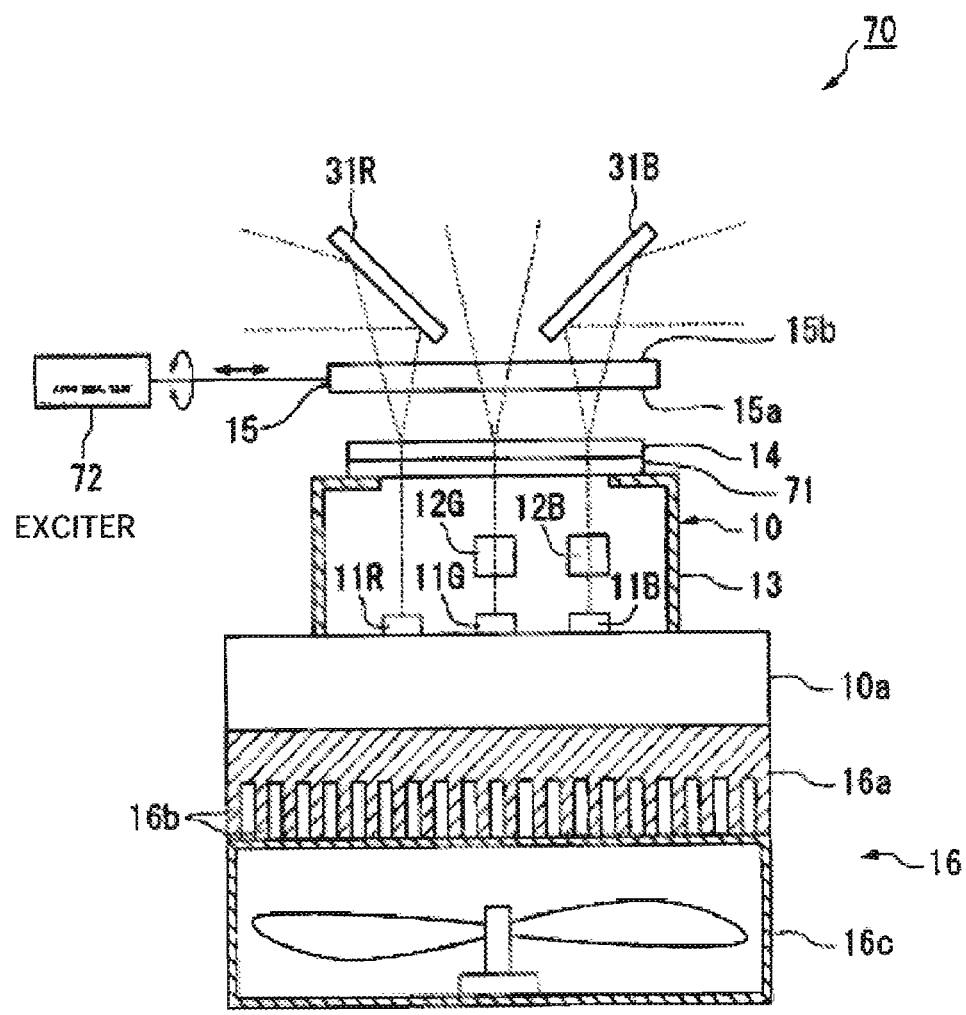

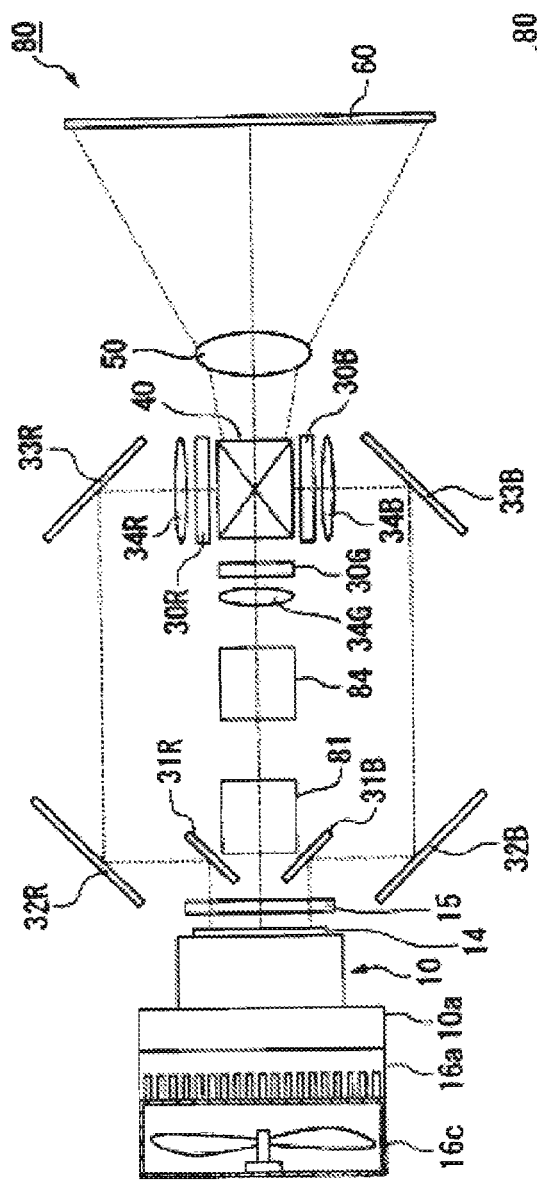
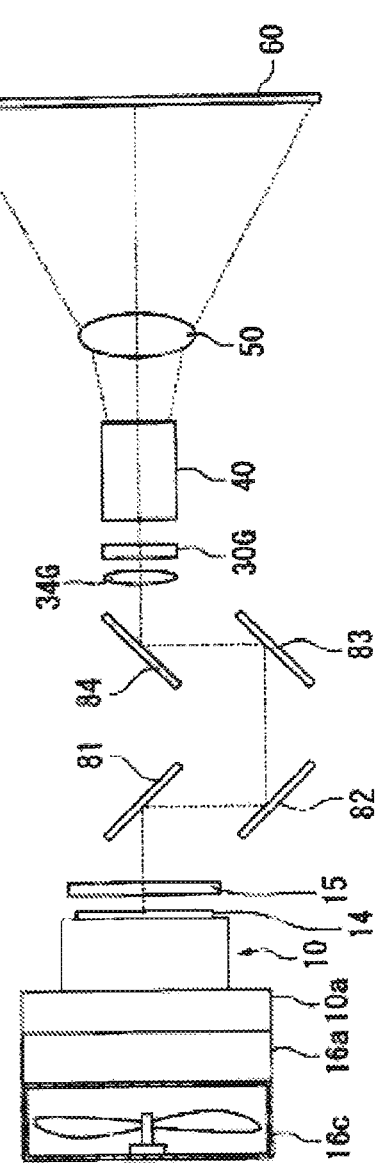
F I G. 4A
F I G. 4B

F I G. 9
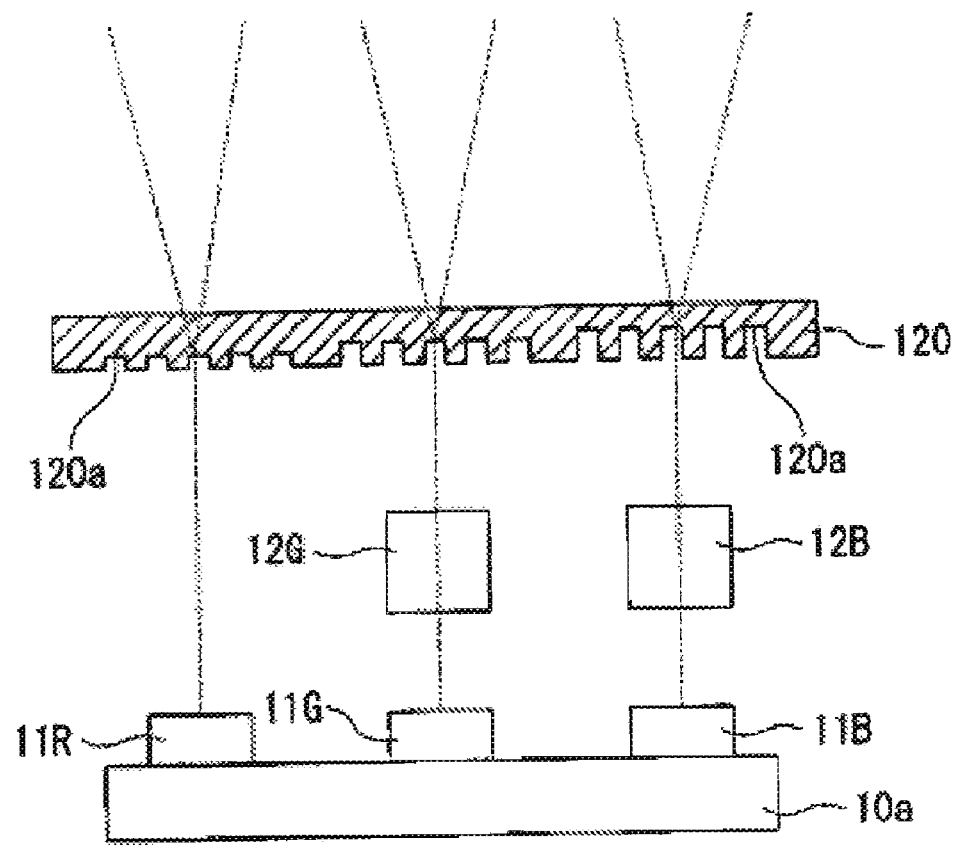

IMAGE DISPLAY APPARATUS AND LIGHT SOURCE UNIT

This application claims priority from Japanese Patent Application No. 2005-285192, the entire disclosure of which is hereby incorporated by reference in its entirety.

BACKGROUND

1. Technical Field

The present invention relates to an image display apparatus and a light source unit.

2. Related Art

In general, an image display apparatus has a light source unit which is compact, emits a bright light beam, and equalizes illumination distribution of the light beam. In a commonly used light source, a light beam emitted from a semiconductor laser source is parallelized (see JP-A-2003-233123).

A projector disclosed in JP-A-2003-233123 includes: red, green, and blue semiconductor laser sources; a collimator lens which parallelizes laser beams emitted from each of the semiconductor laser sources; an optical fiber which guides the laser beams parallelized by the collimator lens; and spatial light modulators which modulate each color light beam emitted from the optical fiber. After passing through the spatial light modulators, each light beam is displayed in a screen through a projection lens.

JP-A-2003-233123 is an example of related art. However, in the projector disclosed in JP-A-2000-233123, each of the semiconductor laser sources are arranged in different positions depending on colors, and thus optical elements have to be disposed independently for each color beam. Therefore, cost increases, and an overall size of the apparatus becomes large. In addition, since the semiconductor laser sources are separated form the collimator lens, the light source unit including the semiconductor laser sources and the collimator lens also becomes large.

SUMMARY

An advantage of some aspects of the present invention is to provide an image display apparatus and a light source unit, which can be downsized and reduce cost.

According to an aspect of the invention, there is provided an image display apparatus comprising: a plurality of laser beam sources which emit different color light beams; a plurality of light modulators which modulate the light beams emitted from the laser beam sources; and a projection element which projects the light beams modulated by the light modulators, wherein the light modulators are disposed such that the light beams are incident from different directions, and the laser beam sources are concentrated in a single position.

In the image display apparatus of an aspect according to the invention, the color light beams emitted from the laser beam sources are modulated by the light modulators. The modulated color light beams are projected by the projection element, thereby displaying an image. In the past, the laser beam sources have been disposed in different positions, and thus various optical elements also have been separately disposed, thereby increasing an overall size of the apparatus. On the other hand, in the invention, the laser beam sources are concentrated in the single position, and thus laser beams are emitted from the single position. Therefore, the optical elements can be shared, thereby downsizing the apparatus and reducing cost.

According to an aspect of the invention, the display apparatus may further comprise a common cooler which cools the laser beams sources.

Since the laser beam sources are concentrated in the single position, even if the laser beam sources are respectively cooled by using coolers, the coolers can be disposed in a concentration manner, thereby improving cooling efficiency. If the laser beam sources are concurrently cooled by a common cooler, the number of elements can be reduced.

In addition, the image display apparatus may further comprise an illumination equalizing element which equalizes distribution of the light beams emitted from the laser beam sources.

Since the laser beam sources are concentrated in the single position, the light beams emitted from the laser beam sources can be concurrently equalized at the nearest position from the laser beam sources. Therefore, the overall apparatus can be downsized.

In addition, the illumination equalizing element may be a diffraction optical element which converts the light beams emitted from the laser beam sources so as to fit the shape and size of irradiated surfaces of the light modulators.

Since the laser beams emitted from the laser beam sources are converted so as to fit the shape and size of the irradiated surfaces of the optical modulators by the diffraction optical element, the laser beams emitted from the laser beam sources can be entirely irradiated onto the optical modulator, thereby improving optical usage efficiency.

In additions in the diffraction optical element, a plurality of notches each having a depth according to a wavelength of light beams emitted from the laser beam sources may be formed on a base in positions where the light beams of different wavelengths are incident.

Since the light beams emitted from each of the color laser beam sources are diffracted by the notches having a depth corresponding to a wavelength of each light beam formed on the base, the light beams irradiated by the single diffraction optical element can be irradiated onto the optical modulator in an optimum condition.

In addition, the image display apparatus may further comprise a case body which contains at least one of the laser beam sources, wherein the illumination equalizing element is fastened to the case body.

In the image display apparatus of an aspect according to the invention, by fastening the illumination equalizing element to the case body, the optical modulators can be positioned such that light beams can be emitted in an optimum condition. Further, an overall structure can be more compact.

In addition, an optical path may be uniform between the illumination equalizing element and the light modulators.

In the image display apparatus of an aspect according to the invention, since the optical path between the illumination equalizing element and the optical modulators is substantially uniform, irradiation angels of the light beams which are emitted from the laser beam sources are uniform. Accordingly, there is no contrast difference among colors, thereby displaying a clear image.

In addition, the image display apparatus may further comprise a common light diffusion member which diffuses the light beams emitted from the laser beam sources.

In the image display apparatus of an aspect according to the invention, since the light beams emitted from the laser beam sources are diffused by the common optical diffusion member, coherence of the light beams directing the optical modulators becomes reduced. Therefore, glittering (e.g. scintillation and speckle) are restricted from occurring.

In addition, at least one of the laser beam sources may be an infrared laser source, and an infrared cut filter may be disposed between the infrared laser source and the light modulators.

In the image display apparatus of an aspect according to the invention, the light beams emitted from the infrared laser source are irradiated onto the optical modulators, for example, after being converted to have a specific wavelength by the wavelength converting element. In this case, since the infrared light beam is cut by the infrared cut filter, only light beams in a specific wavelength band can be irradiated onto the optical modulators, thereby displaying an image having good color gamut.

In addition, the light modulators may be a plurality of liquid crystal panels corresponding to each of the color light beams emitted from the laser beam sources, and may include a color compositor which composites each of the color light beams emitted from the liquid crystal panels and emits the composed color light beams onto the projection element.

In the image display apparatus of an aspect according to the invention, the color light beams emitted from the laser beam sources are respectively modulated by corresponding liquid crystal panels, and then are incident onto the color compositor. The light beams composed from the color compositor are projected by the projection element. Since a so-called three-plate type liquid crystal panel is used in which color components, for example, three colors of red, green, and blue, are respectively converted, a color image corresponding to image data including the three color components can be desirably obtained.

In addition, the image display apparatus may further comprise a case body which contains at least one of the laser beam sources.

In the image display apparatus of an aspect according to the invention, one or more layer beam sources are contained in the case body. Therefore, since the coolers may cool the laser beam sources by locating the case body in a specific place, the laser beam sources can be collected with a simple structure.

In addition, the image display apparatus may further comprise a wavelength converting element which converts a wavelength of a light beam emitted from at least one of the laser beam sources into a specific wavelength.

In the image display apparatus of an aspect according to the invention, if the infrared laser source is used, the infrared laser beam changes to have a specific wavelength by allowing the infrared laser beam to be incident onto the wavelength converting element. Accordingly, the infrared laser beam can be easily converted to be included a specific wavelength band by using the wavelength converting element. In particular, this is desirable to generate a green or blue light beam of which an oscillation source is difficult to be obtained.

According to another aspect of an aspect according to the invention, there is provided a light source unit which has a light modulator modulating a laser beam and a projection element projecting the modulated laser beam, and is used in an image display apparatus, the light source unit comprising: a plurality of laser beam sources which emit different color light beams; a case body which contains at least one of the laser beam sources; and a diffraction optical element which converts the light beams emitted from the laser beam sources so as to fit the shape and size of an irradiated surface of the light modulator, wherein the diffraction optical element is disposed in the case body.

In the image display apparatus of an aspect according to the invention, the light beams which are emitted from the laser beam sources by the diffraction optical element are concurrently equalized, and are converted so as to fit the size and shape of the optical modulator In this case, since the diffraction optical element is disposed in the case body, the overall apparatus can be downsized, and there is no need to determine the location of the diffraction optical element.

In addition, in the diffraction optical element, a plurality of notches each having a depth according to a wavelength of light beams emitted from the laser beam sources may be formed on a base in positions where the light beams of different wavelengths are incident.

In the image display apparatus of an aspect according to the invention, since the light beams emitted from each of the color laser beam sources are diffracted by the notches corresponding to the wavelength of each light beam, the light beams diffracted by the diffraction optical element can be irradiated onto the optical converting element in an optimum condition.

In addition, at least one of the laser beam sources may be an infrared laser source, and an infrared cut filter may be disposed between the infrared laser source and the light modulator.

In the image display apparatus of an aspect according to the invention, the light beams emitted from the infrared laser source are irradiated onto the optical modulator, for example, after being converted to have a specific wavelength by the wavelength converting element. In this case, since the infrared light beam included in the light beams irradiated onto the optical modulator is cut by the infrared cut filter, only a light beam in a specific wavelength band can be irradiated onto the optical modulator.

BRIEF DESCRIPTION OF THE DRAWINGS

The invention will be described with reference to the accompanying drawings, wherein like numbers reference like elements.

FIG. 1 is a plan view of a projector according to a first embodiment of the invention.

FIG. 3 is a plan view of a projector according to a second embodiment of the invention.

FIGS. 4A and 4B are plan views of a projector according to a third embodiment of the invention.

FIG. 9 is a plan view illustrating an example of a modified illumination equalizing element used in a projector according to each embodiment of the invention.

DESCRIPTION OF EXEMPLARY EMBODIMENTS

Figure 2:
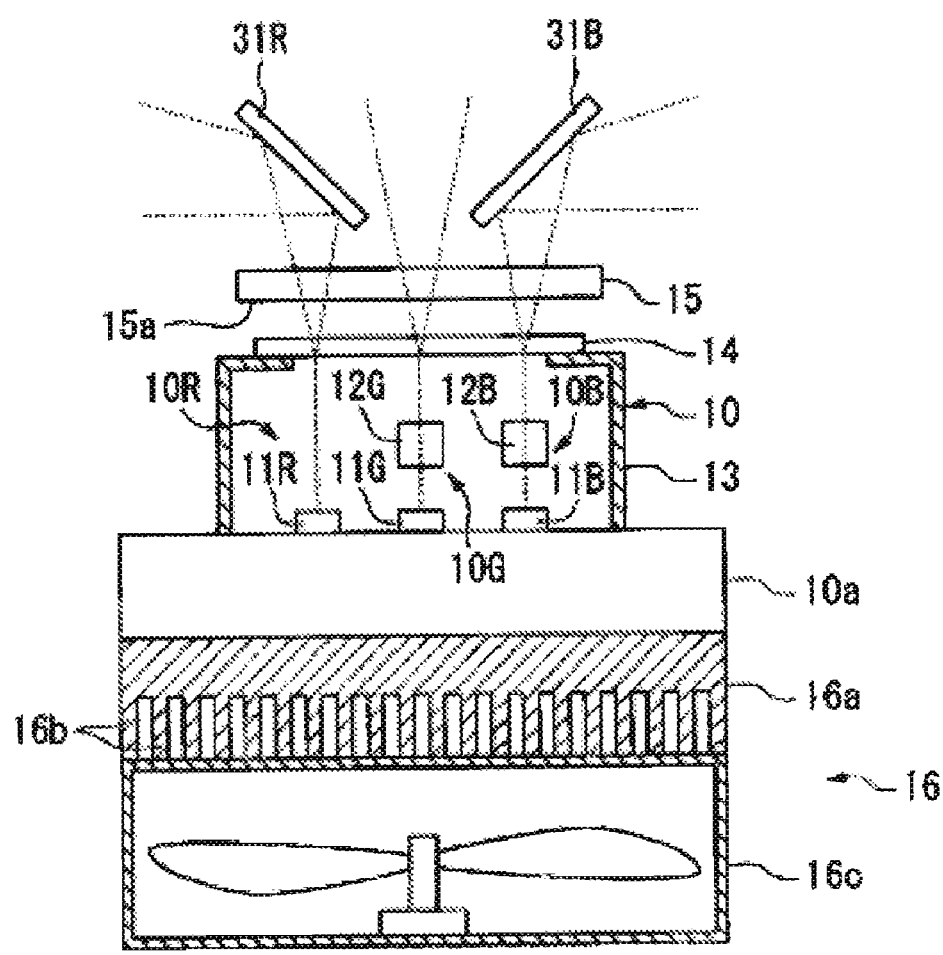
FIG. 2 is an enlarged view of around a light source unit of the projector of FIG. 1.

Hereinafter, exemplary embodiments of the invention will be described in detail with reference to the attached drawings. Scales of elements in the drawings are appropriately modified so that each element can be recognized.

First Embodiment

First, a first embodiment of the invention will be described with reference to FIGS. 1 and 2.

Referring to FIG. 1, an image display apparatus according to the first embodiment of the invention is exemplified as a projector 1 which projects a light beam onto a screen 60 in response to an image signal.

As shown in FIGS. 1 and 2, the projector 1 includes: a light source unit 10 having a red light source unit 10R which emits a red light beam (hereinafter referred to as an R light beam), a green light source unit 10G which emits a green light beam (hereinafter referred to as a G light beam), and a blue light source unit 10B which emits a blue light beam (hereinafter referred to as a B light beam); a plurality of transmitting liquid crystal light valves (light modulators: liquid crystal panels, hereinafter referred to as liquid crystal light valves) 30R, 30G, and 30B which modulate brightness of the R light beam, the G light beam, and the B light beam which are emitted from each of the light source units 10R, 10G, and 10B; a dichroic prism (a color compositor) 40 which composites the converted color light beams to form a color image; and a projection lens (a projection element) 50 which projects the color image obtained from the dichroic prism 40 onto the screen 60.

Referring to FIG. 2, the R light source unit 10R includes a laser beam source 11R which emits the R light beam. Further, the G light source unit 10G includes: a laser beam source 11G (for example, wavelength: 1060 nm) which emits an infrared laser beam; and a wavelength converting element 12G. In this case, in a semiconductor laser source, the R light beam and the B light beam have their oscillation sources, but the G light beam does not have its oscillation source. For this reason, an infrared laser beam has to be incident onto, for example, a PPLN (Periodically Poled LiNbO$_3$: periodically poled lithium niobate) crystal, and then its wavelength is converted to obtain the G light beam. It is desirable to use the PPLN crystal since a large non-linear optical constant can be used so that a wavelength conversion can be performed with high conversion efficiency. Although the original source exists for the B light beam of the semiconductor laser sources, in the first embodiment of the invention, the B light source unit 10B includes a laser beam source 11B (e.g. wavelength: 900 nm) which emits the infrared laser beam and the wavelength converting elements 12B, and the infrared laser beam is incident onto the wavelength converting element 12B, and then its wavelength is converted to obtain the B light beam. Likewise, as for the R light beam, the wavelength converting element is used for converging the infrared laser beam to obtain the R light beam.

The laser beam sources 11R, 11G, and 11B are disposed so that emitted light beams can direct almost in one direction, that is, a direction towards the dichroic prism 40.

Furthermore, the laser beam sources 11R, 11G, and 11B are concentrated in a single position of the same substrate 10a, and are all contained in a case body 13 having an aperture 13a which allows the light beams emitted from each of the laser beam sources 11R, 11G, and 11B to be able to be externally irradiated. The light source unit 10 includes: an illumination equalizing element 14 which is fastened to close the aperture 13a; and a light diffusion plate (a light diffusion member) 15 which is disposed on a surface opposite to a side where the laser beam sources 11R, 11G, and 11B are disposed with respect to an illumination equalizing element 14.

The illumination equalizing element 14 is a diffraction optical element which equalizes illumination distribution of the light beams emitted from the laser beam sources 11R, 11G, and 11B, and converts the light reams emitted from each of the laser beam sources 11R, 11G, and 11B so as to fit the shape and size of illuminated surfaces of transmitting light valves 30R, 30G, and 30B. The diffraction optical element may be a hologram optical element. The hologram optical element may be a computer generated hologram (CGH) in which artificial interference fringes are formed on a hologram disc by using a calculator. It is desirable to use the CGH since a diffraction grating can be freely divided, and aberration does not occur.

The light diffusion plate 15 diffuses the light beams equalized by the illumination equalizing element 14, and restricts glittering from occurring. Furthermore, the light diffusion plate 15 has a disc-shaped frosted glass having a tiny concave portion in an incidence surface 15a. In addition, the light diffusion plate 15 has a light transmission property, and may be a phase difference plate in which a random concave pattern is formed on the incidence surface 15a or a diffraction grating in which a periodically optical pattern is formed thereon. The light diffusion plate 15 may be omitted depending on the laser beam sources 11R, 11G, and 11B.

A cooler 16 which cools the light source unit 10 is disposed in the opposite side of a surface of a substrate 10a constituting the case body 13 on which the laser beam sources 11R, 11G, and 11B are disposed. The cooler 16 includes: a heat sink 16a which diffuses heat generated from each of the laser beam sources 11R, 11G, and 11B through the substrate 10a; and a fan 16c which ventilates the heat sink 16a. The fan 16c is disposed at a location where a heat radiating fin 16b of the heat sink 16a can be ventilated.

As shown in FIG. 1, the liquid crystal light valves 30R, 30G, and 30B are disposed such that the light beams emitted from each of the laser beam sources 11R, 11G, and 11B can be incident in different directions from one another. That is, the liquid crystal light valves 30R, 30G, and 30B face incidence surfaces 40a, 40b, and 40c of the dichroic prism 40.

The light source unit 10 faces the liquid crystal light valve 30G. Accordingly, the G light beam is straightly guided to the liquid crystal light valve 30G, and the R light beam and the B light beam are respectively guided to the liquid crystal light valves 30R and 30B, with their optical paths being curved. Specifically, the G light beam emitted from the laser beam source 11G is directly incident onto a field lens 34G, and its incidence angle is adjusted by the field lens 34G. Thereafter, the G light beam is incident onto the liquid crystal light valve 30G.

The R light beam emitted from the laser beam source 11R changes its optical path by 90 degrees in a direction that is separated from the light source unit 10 by using a first mirror 31R, is then reflected in a direction of the dichroic prism 40 by using a second mirror 32R, and is then reflected towards the field lens 34R by using a third mirror 33R, so that optical path can change by 90 degrees in the shape of "U". The R light beam emitted from the field lens 34R is adjusted so that its incident angle is adjusted by the field lens 34R so as to be incident onto the liquid crystal light valve 30R.

Like in the R light beam emitted from the laser beam source 11R, the B light beam emitted from the laser beam source 11B also changes its optical path by 90 degrees in the shape of "U" by using the first mirror 31B, the second mirror 32B, and the third mirror 33B. Thereafter, its incident angle is adjusted by the field lens 34B so as to be incident onto the liquid crystal light valve 30B.

The optical path between the illumination equalizing element 14 and the liquid crystal light valves 30R and 30B is uniform. In comparison, the optical path between the illumination equalizing element 14 and the liquid crystal light valve 30G is slightly shorter than that of the above optical path. The above structure can restrict the loss of the G light beam which has the greatest effect on brightness of an image.

The cross dichroic prism 40 is constructed by crossing at right angles a dichroic layer which reflects the B light beam and transmits the G light beam and R light beam with respect to a dichroic layer which reflects the G light beam and transmits the B light beam and R light beam. The cross dichroic prism 40 composites the R light beam, the G light beam and the B light beam which are emitted from each of the light source units 10R, 10G, and 10B. The light beam composed from the cross dichroic prism 40 is incident onto the projection lens 50. Thereafter, the light beam is projected onto the screen 60 by the projection lens 50.

Now, a method of projecting an image onto the screen 60 by using the projector 1 according to the first embodiment of the invention will be described.

First, when current is supplied to the laser beam sources 11R, 11G, and 11B of the light source unit 10, light beams are emitted towards the illumination equalizing element 14 as shown in FIGS. 1 and 2. In this case, the light beams emitted from the laser beam sources 11G and 11B are converted to have a specific wavelength band by the wavelength converting elements 12G and 12B, and are then incident onto the illumination equalizing element 14. The G light beam of which illumination is equalized by the illumination equalizing element 14 is straightly incident onto the liquid crystal light valve 30G through the field lens 34G. The R light beam and the B light beam are reflected by the first to third mirrors 31R to 33R and 31B to 33B, and are incident onto the liquid crystal light valve 30R, 30B via the field lens 34R and 34B. The light beams incident onto the liquid crystal light valves 30R, 30G, and 30B are modulated in response to an image signal input to the projector 1, and is emitted towards the dichroic prism 40.

The R, G, and B light beams incident onto the dichroic prism 40 are composed to form a light beam representing a color image, and the light beam is emitted towards the projection lens 50. The projection lens 50 extendedly projects the light beam representing the color image towards the screen 60, thereby displaying the color image.

In the projector 1 according to the first embodiment of the invention, the laser beam sources 11R, 11G, and 11B are concentrated in a single position. Therefore, the illumination equalizing element 14, the light diffusion plate 15, and the cooler 16 can be all shared. As a result, an overall structure can be compact, and the number of elements can be reduced, resulting in less cost. Further, since the laser beam sources 11R, 11G, and 11B are concentrated in the single position, the laser beam sources 11R, 11G, and 11B can be concurrently cooled. Furthermore, the light source unit 10 itself can be compact since the illumination equalizing element 14 is disposed in the case body 13.

Second Embodiment

Now, a second embodiment of the invention will be described in detail with reference to FIG. 3. Hereinafter, in the following embodiments of the invention, projectors having the same structure as the project 1 according to the first embodiment of the invention will be denoted as the same reference numeral, and descriptions thereof will be omitted.

A projector 70 of the second embodiment of the invention is different from that of the first embodiment in that an infrared cut filter 71 is included in the second embodiment of the invention.

Referring to FIG. 3, the infrared cut filter 71 is fastened to close the aperture 13a of the case body 13. The illumination equalizing element 14 is fastened to a surface of the infrared cut filter 71, which is opposite to the side where the laser beam sources 11R, 11G, and 11B are disposed. The infrared cut filter 71 transmits a visible light beam (approximately 380-780 nm) and cuts an infrared light beam (approximately over 780 nm). The illumination equalizing element 14 equalizes illumination of a light beam that passes through the infrared cut filter 71.

An exciter 72 is disposed in the light diffusion plate 15. The exciter 72 changes on a time basis a diffusion state of a laser beam which is incident from the incident surface 15a and is emitted from an emission surface 15b of the diffusion plate 15. As shown in FIG. 3, the exciter 72 moves and rotates the light diffusion plate 15 within the incident surface 15a. Accordingly, when the laser beam incident from the incident surface 15a of the light diffusion plate 15 is emitted from the emission surface 15b, the diffusion state changes on a time basis. Therefore, the laser beam directs the liquid crystal light valves 30R, 30G, and 30B, with its illumination being more equalized.

In the projector 70 of the second embodiment of the invention, since infrared light is cut by the infrared cut filter 71, only a light beam included in a specific wavelength band can be irradiated onto the liquid crystal light valves 30R, 30G, and 30B, thereby displaying an image having good color gamut.

Although the infrared cut filter 71 is disposed in the aperture 13a of the case body 13, the infrared cut filter 71 may be disposed in another position between the laser beam sources 11R, 11G, and 11B and the liquid crystal light valves 30R, 30G, and 30B.

The exciter 72 may be omitted. However, when the exciter 72 is used, occurrence of glittering of the light beams emitted from the liquid crystal light valves 30R, 30G, and 30B can be further restricted. The illumination equalizing element 14 may be vibrated by the exciter 72. The light diffusion plate 15 may be omitted. Also, the light diffusion plate 15 may be an illumination equalizing element having an infrared cut function. The infrared cut function may be performed on a surface of the illumination equalizing element. Also, the illumination equalizing element may have a substrate sucking an infrared light beam.

Third Embodiment

Now, a third embodiment of the invention will be described with reference to FIGS. 4A and 4B.

FIG. 4A is a plan view of a projector 80 according to the third embodiment of the invention. FIG. 4B is a side view of the projector 80 according to the third embodiment of the invention.

The projector 80 of the third embodiment of the invention is different from that of the first embodiment of the invention in that an optical path between the illumination equalizing element 14 and the liquid crystal light valves 30R, 30G, and 30B are uniform.

Referring to FIGS. 4A and 4B, in the projector 80, optical paths of the R light beam and the B light beam are curved within a horizontal surface, and an optical path of the G light beam is curved within a vertical surface. Specifically, the projector 80 includes: a first mirror 81 which converts an optical path of a light beam emitted from the laser beam source 11G by 90°; a second mirror 82 which reflects a light beam reflected from the first mirror in a direction of the liquid crystal light valve 30G; a third mirror 83 which converts an optical path of a light beam reflected by the second mirror 82 by 90 degrees; and a fourth mirror 84 which reflects a light beam reflected from the third mirror 83 onto the liquid crystal light valve 30G. Through the first to fourth mirrors 81 to 84, an optical path length of a light beam which is emitted from the laser beam source 11G and passes through the illumination equalizing element 14 becomes longer than that of the first and second embodiments of the invention, and thus becomes equal to an optical path length between the illumination equalizing element 14 and the liquid crystal light valves 30R and 30B.

In the projector 80 of the third embodiment of the invention, the optical path length between the illumination equalizing element 14 and the liquid crystal light valves 30R, 30G, and 30B is substantially uniform. Therefore, an irradiation angle of each of light beams incident from the laser beam source 11R, 11G, 11B onto the liquid crystal light valves 30R, 30G, and 30B becomes uniform. Accordingly, there is no contrast difference among colors, thereby displaying a clear image.

Forth Embodiment

Figure 5:
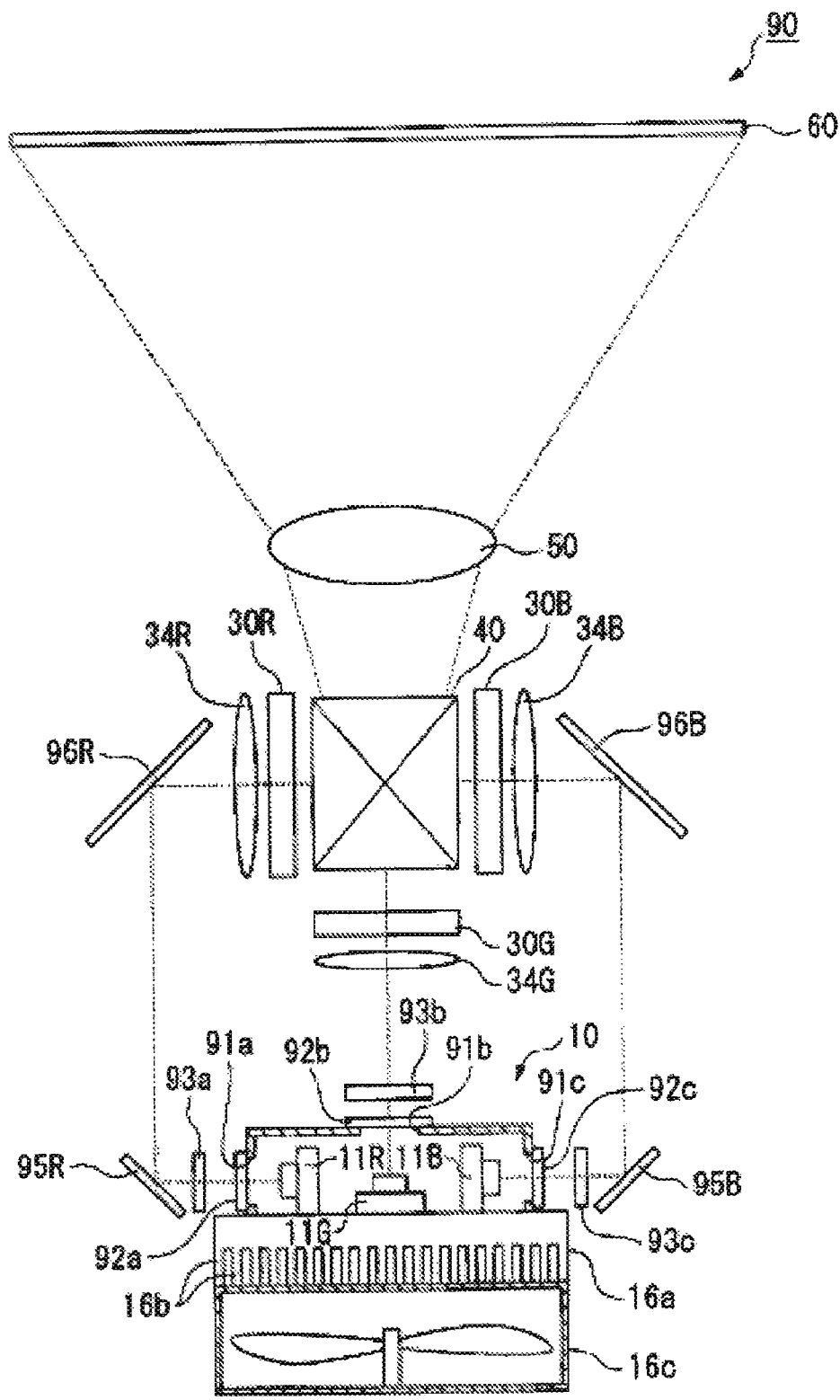
FIG. 5 is a plan view of a projector according to a fourth embodiment of the invention.

Now, a fourth embodiment of the invention will be described with reference to FIG. 5.

A projector 90 of the fourth embodiment of the invention is the same as that of the first and second embodiments in that the laser beam sources 11R, 11G, and 11B are concentrated in a single position. However, difference therebetween lies in that emitted light beams direct difference directions.

The laser beam source 11G is disposed such that a light beam emitted therefrom directs the dichroic prism 40. The laser beam source 11R is disposed such that a light beam emitted therefrom directs in a perpendicular direction with respect to a light beam emitted from the laser beam source 11G. The laser beam source 11B directs in an opposite direction with respect to a light beam emitted from the laser beam source 11R.

Apertures 91a, 91b, and 91c are included in a case body 91 of the light source unit 10, so that light beams respectively emitted from the laser beam sources 11R, 11G, and 11B can be externally irradiated. The light source unit 10 includes: illumination equalizing elements 92a, 92b, and 92c which are fastened to close the apertures 91a, 91b, and 91c, and equalize illumination distribution of light beams emitted from the laser beam sources 11R, 11G, and 11B; and light diffusion plates (light diffusion members) 93a, 93b, and 93c which diffuse each of the light beams equalized by the illumination equalizing elements 92a, 92b, and 92c.

The projector 90 includes: first mirrors 95R and 95B which convert optical paths of light beams emitted from the laser beam sources 11R, 11B, and 11B in the direction of the dichroic prism 40 by 90 degrees; and second mirrors 96R and 96B which reflect light beams reflected from the first mirrors 95R and 95B onto the field lenses 34A and 34B.

In the projector 90 of the fourth embodiment of the invention, the laser beam sources 11R, 11G, and 11B are disposed such the light beams emitted therefrom direct in different directions from one another, thereby reducing the number of mirrors. Accordingly, the number of elements can be reduced, which leads to low cost.

While the invention has been particularly shown and described with reference to exemplary embodiments thereof, various changes in form and details may be made therein without departing from the spirit and scope of the invention.

Figure 6:
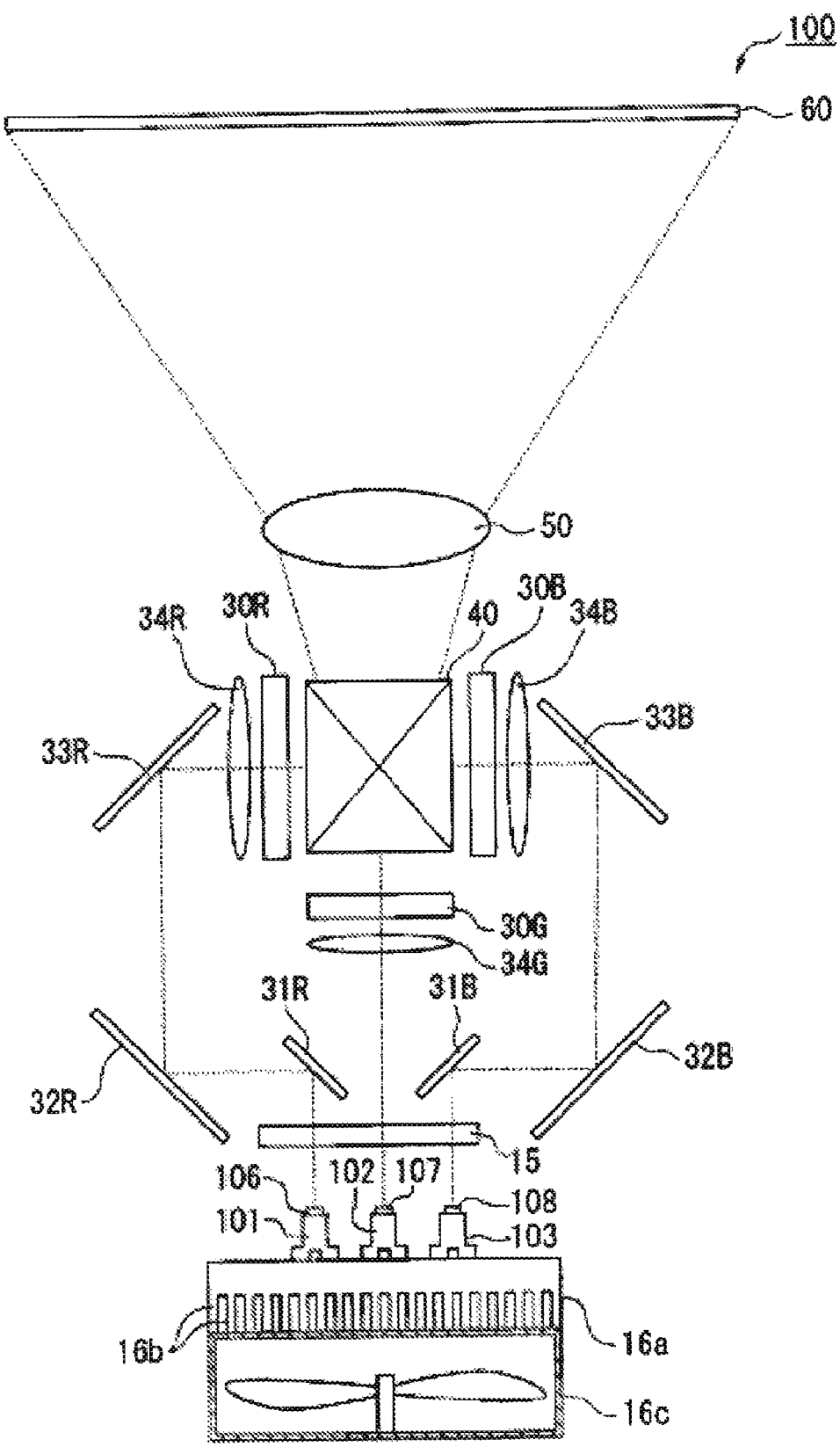
FIG. 6 is a plan view illustrating an example of a modified projector according to each embodiment of the invention.

For example, although the laser beam sources 11R, 11G, and 11B are all contained in one case body 13 in each embodiment of the invention, the case body 13 may contain at least one of the laser beam sources 11R, 11G, and 11B. That is, as shown in FIG. 6, a projector 100 may be provided in which the laser beam sources 11R, 11G, and 11B are respectively contained in case bodies 101, 102, and 103, and illumination equalizing elements 106, 107, and 108 are respectively disposed in the case bodies 101, 102, and 103.

Figure 7:
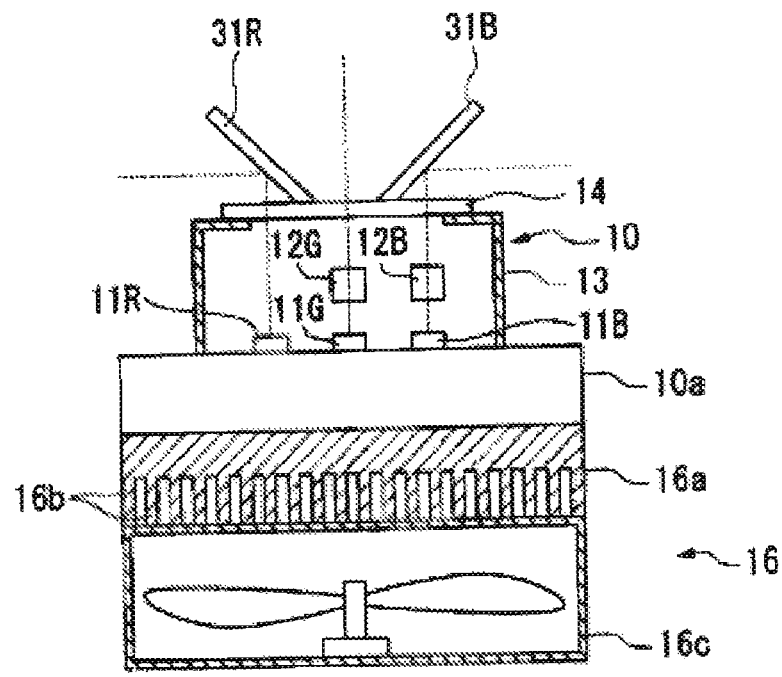
FIG. 7 is a plan view illustrating an example of a modified mirror used in a projector according to each embodiment of the invention.
Figure 8:
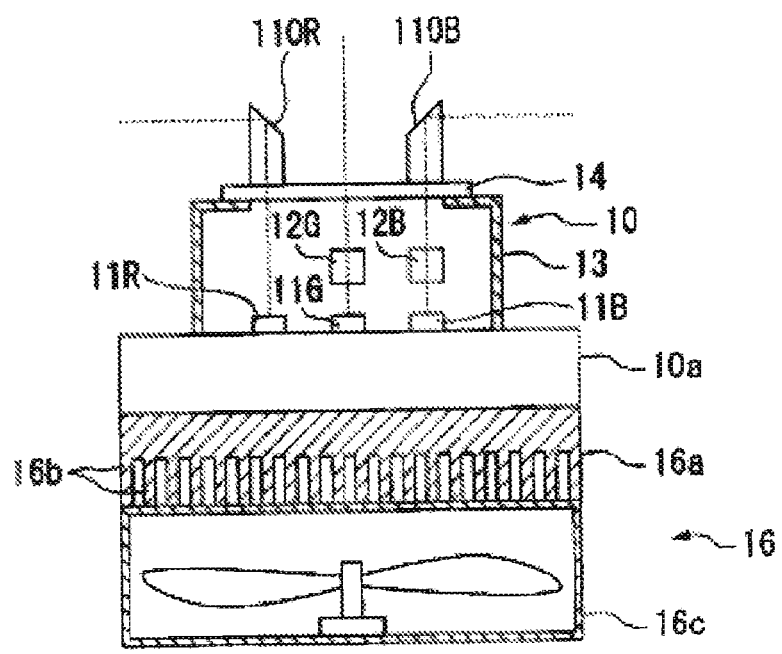
FIG. 8 is a plan view illustrating another example of a modified mirror used in a projector according to each embodiment of the invention.

In the first to fourth embodiments of the invention, as shown in FIG. 7, the first mirror may be fastened to the illumination equalizing elements 14, 92a, 92b, and 92c. When the light diffusion member 15 is used, the illumination equalizing elements 14, 92a, 92b, and 92c may be fastened to the light diffusion member 15. As shown in FIG. 8, prisms 110R and 110B converting optical paths by 90° may be used instead of the first mirrors 31R, 31B, 95R, and 95B.

Although the CGH is used as the illumination equalizing element 14, the invention is not limited thereto. For example, as shown in FIG. 9, the illumination equalizing element 14 may be a diffraction optical element 120 in which a plurality of notches 120a each having a depth according to a wavelength of light beams emitted from the laser beam sources 11R, 11G, 11B are formed on a base (e.g. glass) in positions where the light beams of different wavelengths are incident. By using the diffraction optical element 120, the light beams emitted from the laser beam sources 11R, 11G, and 11B are diffracted by the notches 120a which are formed on the base and have a different depth according to a wavelength of each light beam. Therefore, the light beams diffracted by the diffraction optical element 120 can be irradiated onto the liquid crystal light valves 30R, 30G, and 30B.

In the light equalizing element 12 of the first to third embodiments of the invention, the light beams emitted from the laser beam sources 11R, 11G, and 11B are diffracted by using one base. However, the light equalizing element may be disposed for each of the laser beam sources 11R, 11G, and 11B.

Even if the laser beam sources 11R, 11G, and 11B are respectively cooled by using independent coolers, cooling efficiency can be improved.

What is claimed is:

1. An image display apparatus, comprising:
a substrate;
a plurality of laser beam sources that emit different color light beams disposed on a common plane of the substrate;
a plurality of light modulators that modulate the light beams emitted from the laser beam sources, the light modulators being disposed such that the light beams are incident from different directions;
a projection element that projects the light beams modulated by the light modulators; and
an illumination equalizing element that equalizes distribution of the light beams emitted from the laser beam sources, the illumination equalizing element being a diffraction optical element that converts the light beams emitted from the laser beam sources so as to fit a shape and size of irradiated surfaces of the light modulators,
the laser beam sources being concentrated with regard to their relative positions,
the plurality of laser beam sources including a first source, a second source and a third source that emit a green light, a red light and a blue light, respectively, and an optical path of the green light being shorter than optical paths of the red light and the blue light, and
one of the plurality of laser beam sources emitting its laser beam in a first direction, another of the plurality of laser beam sources emitting its laser beam in a second direction, the first direction being perpendicular to the second direction.

2. The image display apparatus according to claim 1, further comprising a common cooler that cools the laser beams sources.

3. The image display apparatus according to claim 1, the diffraction optical element including a base and a plurality of notches, each having a depth according to a wavelength of light beams emitted from the laser beam sources, that are formed on the base in positions where the light beams of different wavelengths are incident.

4. The image display apparatus according to claim 1, further comprising a case body that houses at least one of the laser beam sources, the illumination equalizing element being fastened to the case body.

5. The image display apparatus according to claim 1, an optical path being uniform between the illumination equalizing element and the light modulators.

6. The image display apparatus according to claim 1, further comprising a light diffusion member that diffuses the light beams emitted from the laser beam sources.

7. The image display apparatus according to claim 1, at least one of the laser beam sources being an infrared laser source, and
further comprising an infrared cut filter disposed between the at least one infrared laser source and the light modulators.

8. The image display apparatus according to claim 1, the light modulators being a plurality of liquid crystal panels corresponding to each of the color light beams emitted from the laser beam sources, and including a color compositor that composites each of the color light beams emitted from the liquid crystal panels and emits the composed color light beams onto the projection element.

9. The image display apparatus according to claim 1, further comprising a case body that houses at least one of the laser beam sources.

10. The image display apparatus according to claim 1, further comprising a wavelength converting element that converts a wavelength of a light beam emitted from at least one of the laser beam sources into a specific wavelength.

11. A light source unit for use with an image display apparatus that includes a light modulator that modulates a laser beam and a projection element that projects the modulated laser beam, the light source unit comprising:
a substrate;
a plurality of laser beam sources that emit different color light beams disposed on a common plane of the substrate;
a case body that contains at least one of the laser beam sources; and
a diffraction optical element that converts the light beams emitted from the laser beam sources so as to fit a shape and size of an irradiated surface of the light modulator,
the diffraction optical element equalizing distribution of the light beams emitted from the laser beam sources,
the diffraction optical element being disposed in the case body,
the plurality of laser beam sources including a first source, a second source and a third source that emit a green light, a red light and a blue light, respectively, and an optical path of the green light being shorter than optical paths of the red light and the blue light, and
one of the plurality of laser beam sources emitting its laser beam in a first direction, another of the plurality of laser beam sources emitting its laser beam in a second direction, the first direction being perpendicular to the second direction.

12. The light source unit according to claim 11, the diffraction optical element including a base and a plurality of notches, each having a depth according to a wavelength of light beams emitted from the laser beam sources, that are formed on the base in positions where the light beams of different wavelengths are incident.

13. The light source unit according to claim 11, at least one of the laser beam sources being an infrared laser source, and
further comprising an infrared cut filter disposed between the at least one infrared laser source and the light modulator.

14. An image display apparatus, comprising:
a substrate;
at least two light beam sources that each emit a light beam, the at least two light beam sources disposed adjacent to each other on a common plane of the substrate;
at least two light modulators that each modulate the light beam emitted from one of the at least two light beam sources;
a projection element that projects the modulated light beams;
a single cooler that cools the at least two light beam sources by virtue of the light beam sources being disposed adjacent to each other; and
an illumination equalizing element that equalizes distribution of the light beams emitted from the light beam sources,
the illumination equalizing element being a diffraction optical element that converts the light beams emitted from the light beam sources so as to fit a shape and size of irradiated surfaces of the light modulators,
the at least two light beam sources including a first source, a second source and a third source that emit a green light, a red light and a blue light, respectively, and an optical path of the green light being shorter than optical paths of the red light and the blue light, and
one of at least two light beam sources emitting its light beam in a first direction, another of the at least two light beam sources emitting its light beam in a second direction, the first direction begin perpendicular to the second direction.

15. The image display apparatus according to claim 2, the common cooler including a heat sink and a fan, the heat sink being disposed on a surface of the substrate opposite to the common surface, the heat sink diffusing heat generated from each of the laser beam sources though the substrate, and the fan ventilating the heat sink.

16. The light source unit according to claim 11, further comprising:
a common cooler that cools the laser beams sources,
the common cooler including a heat sink and a fan, the heat sink being disposed on a surface of the substrate opposite to the common surface, the heat sink diffusing heat generated from each of the laser beam sources though the substrate, and the fan ventilating the heat sink.

17. The image display apparatus according to claim 14, the single cooler including a heat sink and a fan, the heat sink being disposed on a surface of the substrate opposite to the common surface, the heat sink diffusing heat generated from each of the laser beam sources though the substrate, and the fan ventilating the heat sink.

* * * * *